US012569855B2

(12) United States Patent
Zhang et al.

(10) Patent No.: US 12,569,855 B2
(45) Date of Patent: Mar. 10, 2026

(54) NANO PULVERIZING DEVICE FOR PROCESSING RECONSTITUTED RICE FLOUR

(71) Applicant: Harbin University Of Commerce, Harbin (CN)

(72) Inventors: Na Zhang, Harbin (CN); Yang Yang, Harbin (CN); Xin Bian, Harbin (CN); Chunmin Ma, Harbin (CN); Xiaofei Liu, Harbin (CN); Bing Wang, Harbin (CN); Fenglian Chen, Harbin (CN); Yinyuan He, Harbin (CN)

(73) Assignee: Harbin University Of Commerce, Harbin (CN)

( * ) Notice: Subject to any disclaimer, the term of this patent is extended or adjusted under 35 U.S.C. 154(b) by 277 days.

(21) Appl. No.: 18/493,029

(22) Filed: Oct. 24, 2023

(65) Prior Publication Data

US 2025/0128264 A1 Apr. 24, 2025

(51) Int. Cl.

*B02C 13/16* (2006.01)
*B02C 13/20* (2006.01)
*B02C 13/282* (2006.01)
*B02C 23/20* (2006.01)
*B02C 23/30* (2006.01)

(52) U.S. Cl.

CPC .............. *B02C 13/16* (2013.01); *B02C 13/20* (2013.01); *B02C 13/282* (2013.01); *B02C 23/30* (2013.01)

(58) Field of Classification Search

CPC ........ B02C 13/16; B02C 13/20; B02C 13/282
See application file for complete search history.

(56) References Cited

FOREIGN PATENT DOCUMENTS

| | | | | |
|---|---|---|---|---|
| CN | 205495771 U * | 8/2016 | ............... | B02C 4/32 |
| KR | 200454142 Y1 * | 6/2011 | ............... | B02C 4/32 |
| WO | WO-2018079092 A1 * | 5/2018 | ............... | B02C 7/17 |

OTHER PUBLICATIONS

English translate (WO2018079092A1), retrieved date Oct. 8, 2025.*
English translate (CN205495771U), retrieved date Oct. 8, 2025.*
English translate (KR200454142Y1), retrieved date Oct. 8, 2025.*

* cited by examiner

*Primary Examiner* — Mohammed S. Alawadi

(57) ABSTRACT

Disclosed is a nano pulverizing device for processing reconstituted rice flour which includes a bottom plate, support legs are fixedly connected to corners of a lower surface of the bottom plate, a housing is arranged on an upper surface of the bottom plate, and a rotating motor is arranged on the lower surface of the bottom plate. The rotating motor penetrates through the lower surface of the bottom plate and extends to the upper surface of the bottom plate, and a crushing device is rotationally connected to one end, extending to the upper surface of the bottom plate, of the rotating motor. A support frame is fixedly connected to an inner wall of the housing, a support plate is fixedly connected to a lower surface of the support frame, and a flexible plate is fixedly connected to a lower surface of the support plate.

5 Claims, 9 Drawing Sheets

NANO PULVERIZING DEVICE FOR PROCESSING RECONSTITUTED RICE FLOUR

TECHNICAL FIELD

The present disclosure relates to the technical field of nano pulverizing, and in particular to a nano pulverizing device for processing reconstituted rice flour.

BACKGROUND

Nano-grinder is a novel grinder. With the imported high-precision double-end mechanical seal, the minimum grinding medium can be used. The material enters a grinding chamber from the top with a feed pump, during intense grinding, the rod pin and stator continuously and violently impact the grinding medium, and the grinding medium acts on the material again to make the material fully ground. At the discharge port, due to different densities, the grinding medium returns to the grinding chamber, while the materials flow out of the grinding chamber through a gap separator under the pressure of the feed pump. Nano-grinder is originally originated in Germany, and is used in the fields of carbon nanotubes, nano-material pigments, nano-coatings, inks, inkjet inks, batteries, functional ceramics, photovoltaic materials, cosmetics, food, protein, and the like.

After the material is subjected to nano-grinding, powder needs to be collected. However, powder is often difficult to collect, and there is often a lot of loss when the commercially available nano pulverizing device is used for powder collection.

SUMMARY

In order to achieve the above objective, the present disclosure is achieved through the following technical solutions: a nano pulverizing device for processing reconstituted rice flour includes a bottom plate, support legs are fixedly connected to corners of a lower surface of the bottom plate, a housing is arranged on an upper surface of the bottom plate, and a rotating motor is arranged on the lower surface of the bottom plate. The rotating motor is provided to drive a grinding device to produce a rotating effect, such that the grinding device can generate a rotating friction effect with materials, thus achieving the effect of pulverizing the materials. The rotating motor penetrates through the lower surface of the bottom plate and extends to the upper surface of the bottom plate, a crushing device is rotationally connected to one end, extending to the upper surface of the bottom plate, of the rotating motor. A support frame is fixedly connected to an inner wall of the housing, a support plate is fixedly connected to a lower surface of the support frame, and a flexible plate is fixedly connected to a lower surface of the support plate. An arc-shaped flexible plate is fixedly connected between opposite surfaces of the support frame and the support plate. The flexible plate and the arc-shaped flexible plate are provided to enable material scraps on an inner wall of the housing to make contact with the crushing device again through vibration, thus achieving the effect of sufficiently crushing the materials. The rotating motor may generate vibration after starting to rotate. As the vibration of the housing drives the flexible plate and the arc-shaped flexible plate on the lower surfaces of the support frame and the support plate to vibrate, the flexible plate and the arc-shaped flexible plate may amplify the produced vibration, thus vibrating the materials on the inner wall of the housing down. A grinding device is arranged at the inner wall of the housing, a clamping groove is provided on an upper surface of the housing, and the clamping groove provided on the upper surface of the housing is sleeved with a cover plate.

Preferably, the crushing device includes a rotating column, and the rotating column is connected to an output end of the rotating motor. The crushing device is provided to crush the materials. During operation, an operator places the materials to be pulverized at an inner cavity of the housing, and then connects the rotating motor to a power supply and turns on a switch of the rotating motor. The rotating motor starts to operate and makes the rotating column start to rotate. During the rotation of the rotating column, an outer surface of a grinding barrel and a grinding column both make contact with the materials, thus pulverizing the materials during high-speed rotation. An outer surface of the rotating column is sleeved with a grinding barrel, support columns are fixedly connected to an outer surface of the grinding barrel, and a grinding column is rotationally connected between opposite surfaces of the support columns. A collecting groove is provided on an upper surface of the grinding barrel, and a clamping plate is fixedly connected to the collecting groove provided on the upper surface of the grinding barrel. A fixing ring is arranged on the upper surface of the grinding barrel, and a partition plate is fixedly connected to a surface of the fixing ring. The collecting groove, the fixing ring and the partition plate are provided to collect materials which are pulverized to a certain diameter. After the materials are pulverized by the grinding barrel and the grinding column, during the rotation of the rotating column, materials with a small diameter are enabled to enter the collecting groove provided on the grinding barrel, and the partition plate plays a role in screening.

Preferably, the grinding device includes a grinding device housing, and the grinding device housing is fixedly connected to an inner wall of the housing. An inner cavity of the grinding device housing is sleeved with a movable column, and the movable column penetrates through the grinding device housing and extends to an outer surface of the grinding device housing. An extrusion plate is fixedly connected to one end, extending to the outer surface of the grinding device housing, of the movable column. A grinding strip is fixedly connected to an outer surface of the extrusion plate, an elastic column is arranged at one end, away from the extrusion plate, of the movable column, and the elastic column is in extrusion fit with the movable column. The grinding device is provided to cooperate with the crushing device, thus achieving the effect of pulverizing the materials. During operation, the rotating motor rotates to drive the crushing device to rotate. During rotation, the materials may be pulverized between the crushing device and the grinding device. The grinding strip in the grinding device can play a role in grinding. The movable column and the elastic column may provide a certain buffering effect by extruding with each other, thus preventing bulky materials from damaging the device.

Preferably, an upper surface of the cover plate is provided with a circular hole, and a suction device is sleeved at the circular hole provided on the upper surface of the cover plate. The suction device includes a suction device housing. A collecting pipe is fixedly connected to an upper surface of the suction device housing, and a motor support plate is fixedly connected to an inner wall of the suction device housing. A fan motor is arranged at one end, away from the suction device housing, of the motor support plate, and a fan rotating column is rotationally connected to a lower surface of the fan motor. Fan blades are fixedly connected to an outer surface of the fan rotating column, and a bottom end of the fan rotating column is sleeved with a bottom limit column. Suction device support plates are fixedly connected between opposite surfaces of the bottom limit column and the motor support plate, and a fine grinding device is rotationally connected between opposite surfaces of the suction device support plates. The suction device is provided to collect the materials which have been completely ground, and the pulverized materials can be collected by light suction. During operation, a switch of the fan motor is turned on by the operator, the fan motor drives the fan rotating column to rotate, thus enabling the fan blades to generate suction during rotation to collect the materials.

Preferably, the fine grinding device includes a fine grinding device rotating column which is rotationally connected between opposite surfaces of the suction device support plates. A fine grinding fan plate is fixedly connected to an outer surface of the fine grinding device rotating column. An inner cavity of the fine grinding fan plate is sleeved with a fine grinding device movable column. A wavy line elastic sheet is provided between opposite surfaces of the inner cavity of the fine grinding fan plate and the fine grinding device movable column. The movable column is in extrusion fit with the wavy line elastic sheet. The movable column penetrates through the inner cavity of the fine grinding fan plate and extends to an outer surface of the fine grinding fan plate, and a fine grinding plate is fixedly connected to one end, extending to the outer surface of the fine grinding fan plate, of the movable column. The fine grinding device is provided to further pulverize the materials. During the rotation of the fan, the fine grinding fan plate also rotates, such that the materials passing through the fine grinding device can become finer under the action of the fine grinding plate.

The nano pulverizing device for processing reconstituted rice flour is provided by the present disclosure. The present disclosure has the following beneficial effects.

Firstly, in accordance with the nano pulverizing device for processing reconstituted rice flour, the rotating motor is provided to drive a grinding device to produce a rotating effect, such that the grinding device can generate a rotating friction effect with materials, thus achieving the effect of pulverizing the materials. The flexible plate and the arc-shaped flexible plate are provided to enable material scraps on an inner wall of the housing to make contact with the crushing device again through vibration, thus achieving the effect of sufficiently crushing the materials. The rotating motor may generate vibration after starting to rotate. As the vibration of the housing drives the flexible plate and the arc-shaped flexible plate on the lower surfaces of the support frame and the support plate to vibrate, the flexible plate and the arc-shaped flexible plate may amplify the produced vibration, thus vibrating the materials on the inner wall of the housing down.

Secondly, in accordance with the nano pulverizing device for processing reconstituted rice flour, the crushing device is provided to crush the materials. During operation, an operator places the materials to be pulverized at an inner cavity of the housing, and then connects the rotating motor to a power supply and turns on a switch of the rotating motor. The rotating motor starts to operate and makes the rotating column to rotate. During the rotation of the rotating column, an outer surface of a grinding barrel and a grinding column both make contact with the materials, thus pulverizing the materials during high-speed rotation. The collecting groove, the fixing ring and the partition plate are provided to collect materials which are pulverized to a certain diameter. After the materials are pulverized by the grinding barrel and the grinding column, during the rotation of the rotating column, materials with a small diameter are enabled to enter the collecting groove provided on the grinding barrel, and the partition plate plays a role in screening.

Thirdly, in accordance with the nano pulverizing device for processing reconstituted rice flour, the grinding device is provided to cooperate with the crushing device, thus achieving the effect of pulverizing the materials. During operation, the rotating motor rotates to drive the crushing device to rotate. During rotation, the materials may be pulverized between the crushing device and the grinding device. The grinding strip in the grinding device can play a role in grinding. The movable column and the elastic column may provide a certain buffering effect by extruding with each other, thus preventing bulky materials from damaging the device.

Lastly, in accordance with the nano pulverizing device for processing reconstituted rice flour, the suction device is provided to collect the materials which have been completely ground, and the pulverized materials can be collected by light suction. During operation, the switch of the fan motor is turned on by the operator, the fan motor drives the fan rotating column to rotate, thus enabling the fan blades to generate suction during rotation to collect the materials. The fine grinding device is provided to further pulverize the materials. During the rotation of the fan, the fine grinding fan plate also rotates, such that the materials passing through the fine grinding device can become finer under the action of the fine grinding plate.

DETAILED DESCRIPTION OF THE EMBODIMENTS

The present disclosure is further described below with reference to the accompanying drawings and embodiments. Embodiments of the present disclosure are given for the purpose of illustration and description and are not exhaustive or limited to the disclosed form. Many modifications and changes are apparent to those of ordinary skill in the art. Embodiments have been selected and described to illustrate the principles and practical applications of the present disclosure better, and to enable those of ordinary skill in the art to understand the present disclosure and thus design various embodiments with various modifications suitable for a particular use.

Figure 1:
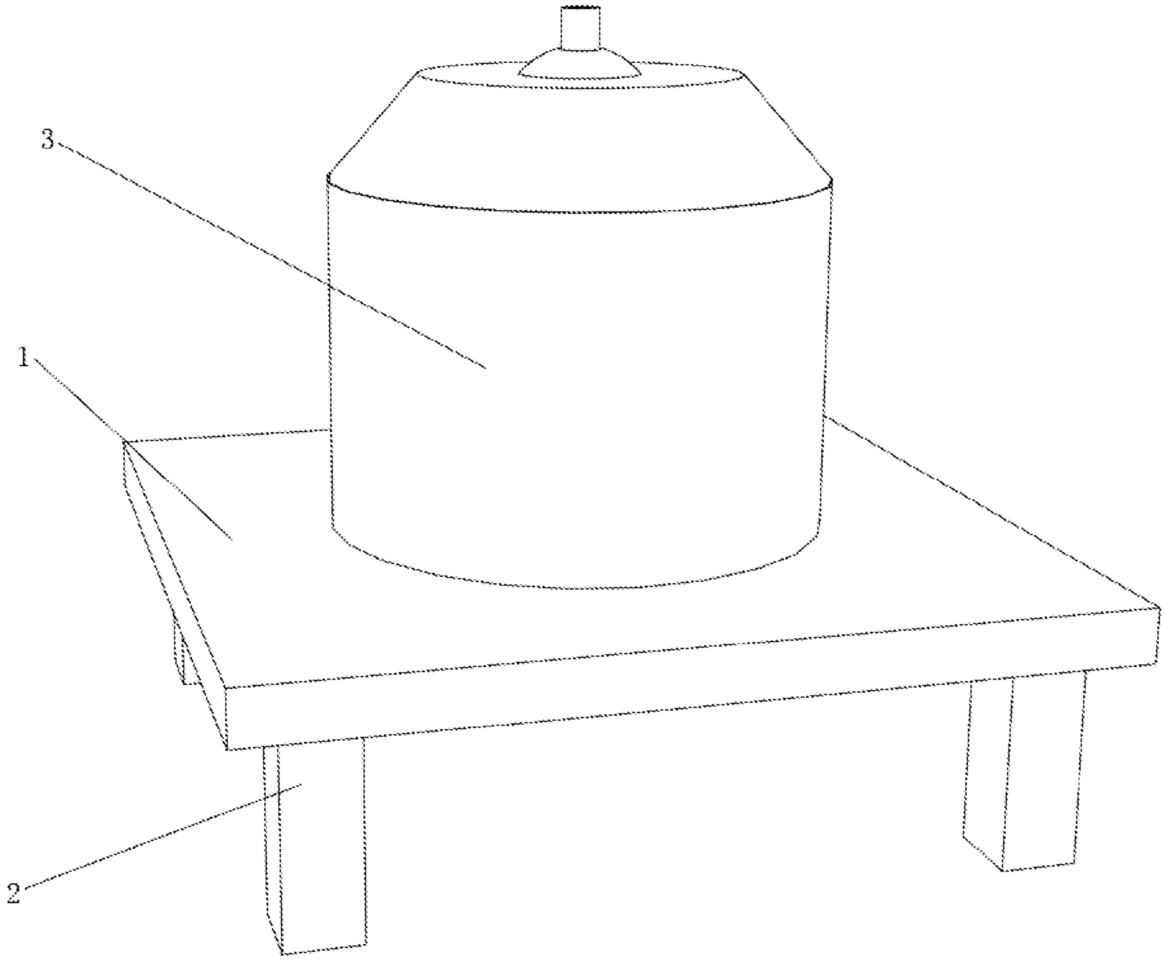
FIG. 1 is a schematic diagram of an overall structure in accordance with the present disclosure.
Figure 2:
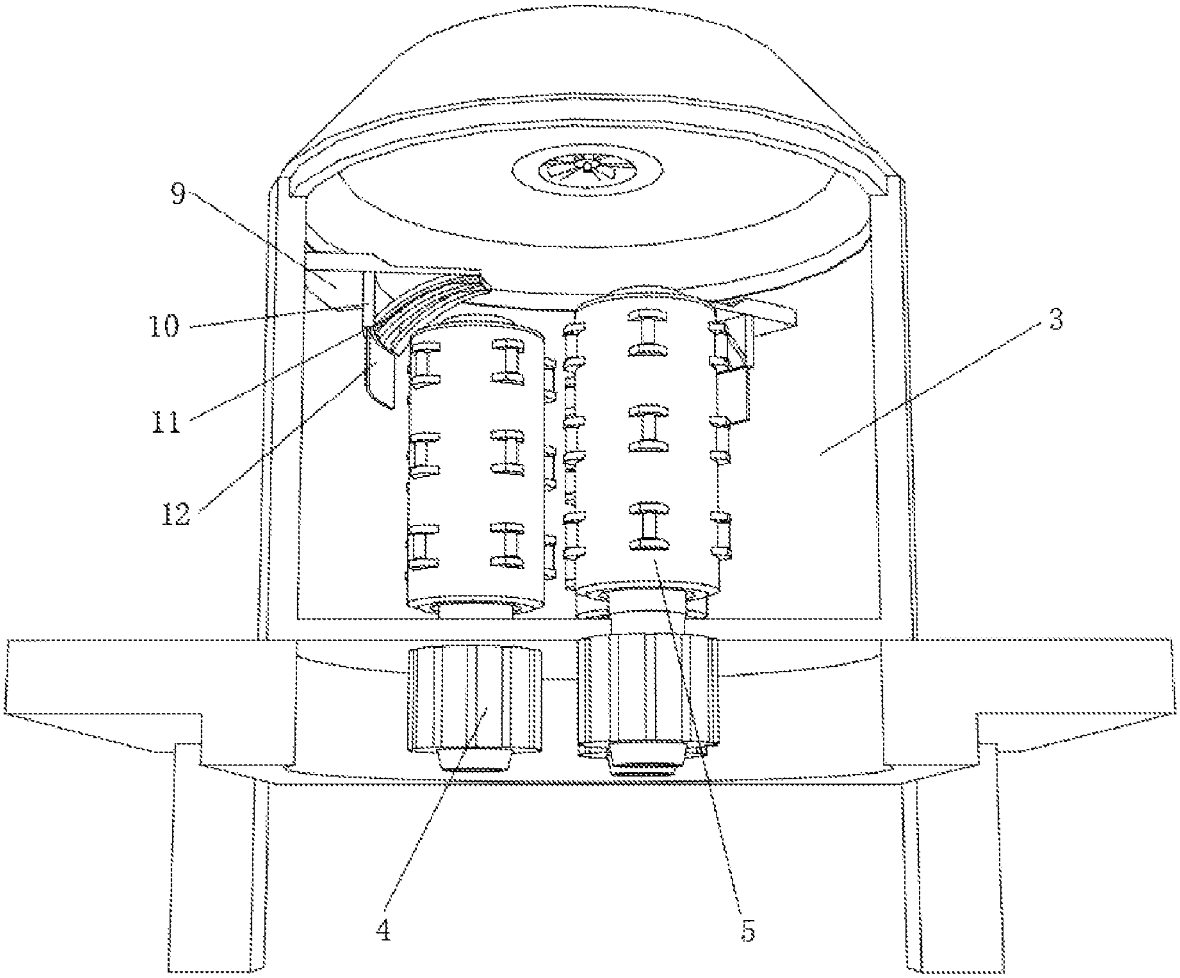
FIG. 2 is a schematic diagram of an overall sectional structure in accordance with the present disclosure.
Figure 3:
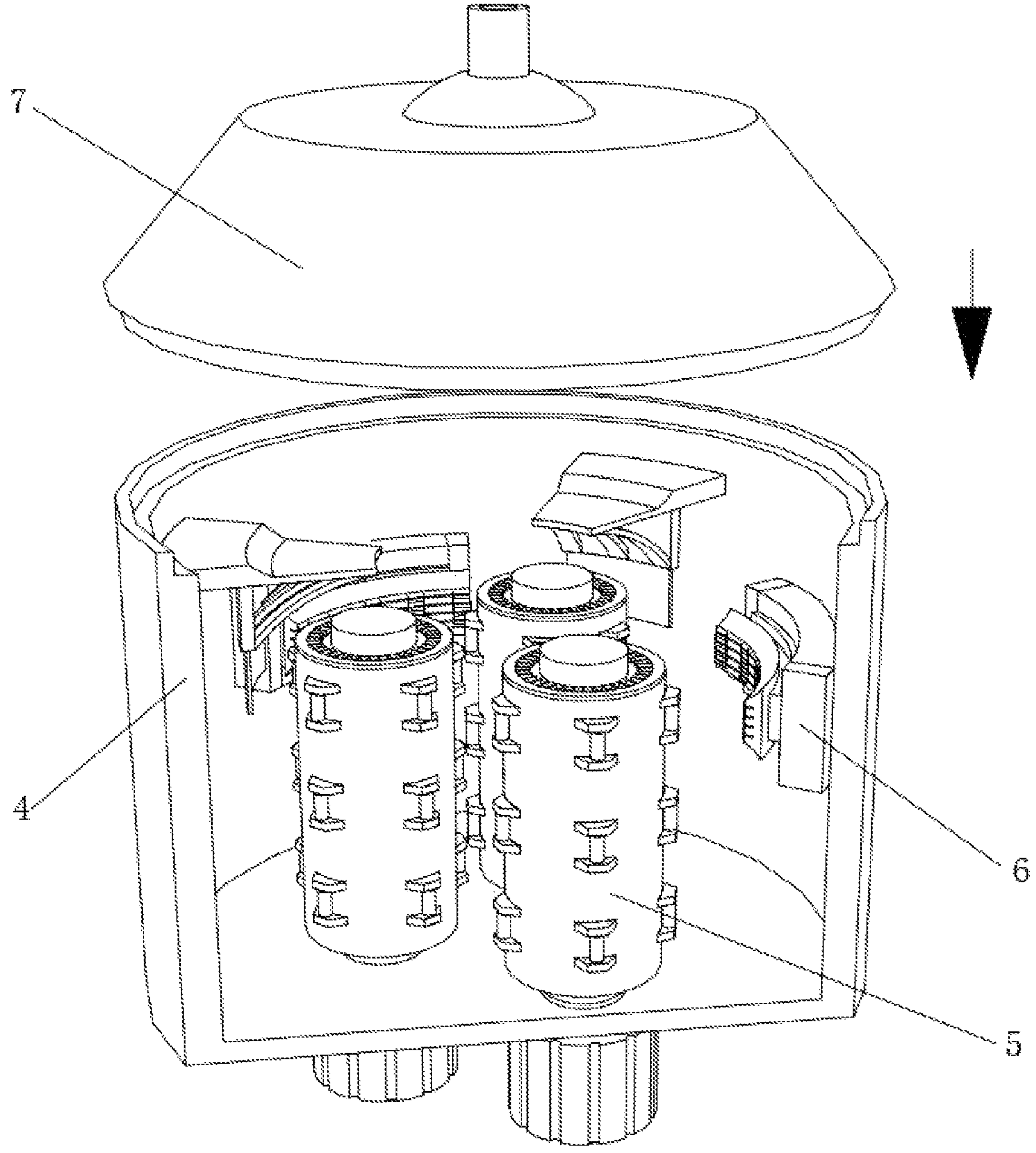
FIG. 3 is a schematic diagram of an exploded structure in accordance with the present disclosure.
Figure 4:
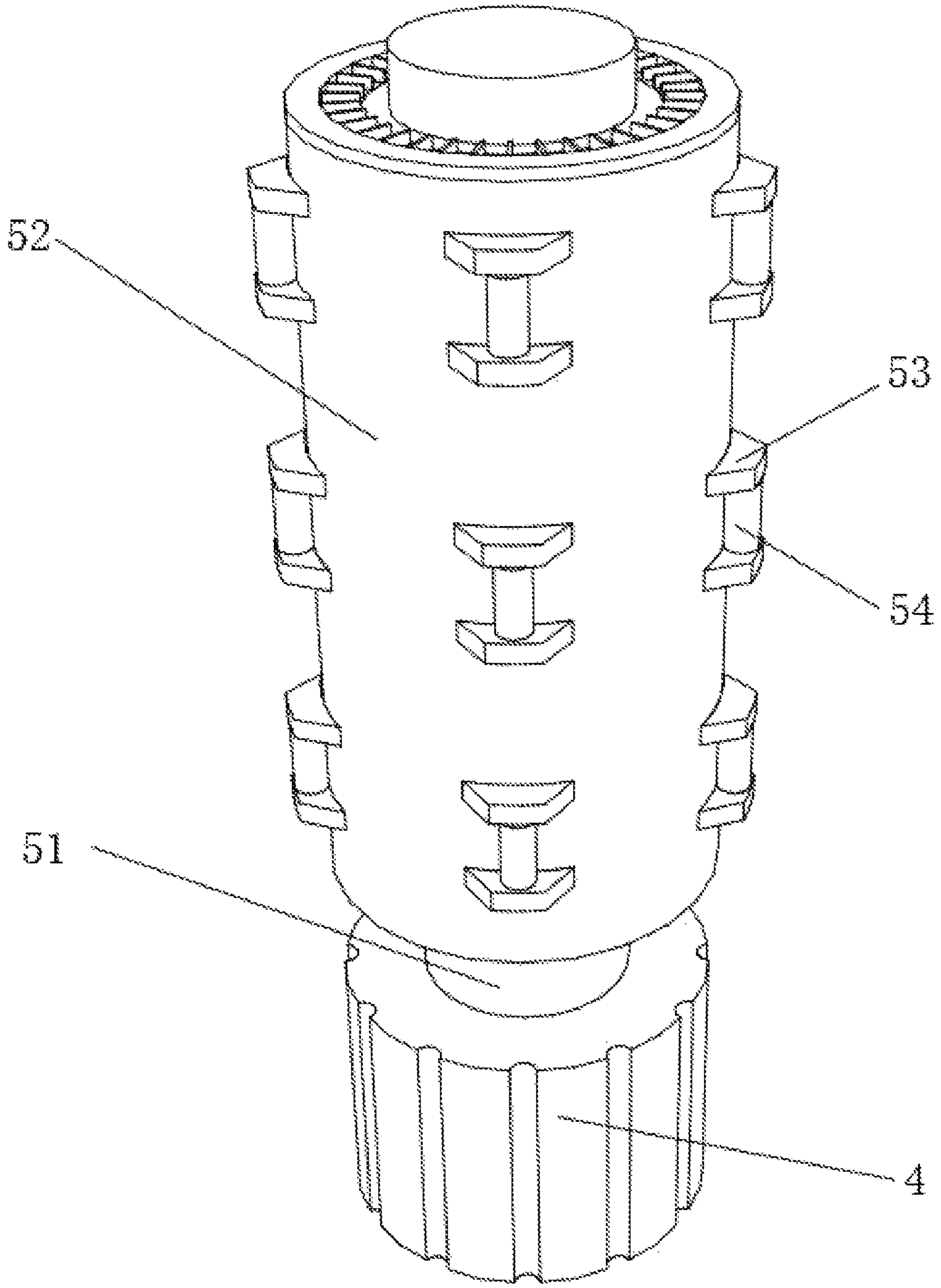
FIG. 4 is a structural schematic diagram of a crushing device in accordance with the present disclosure.
Figure 5:
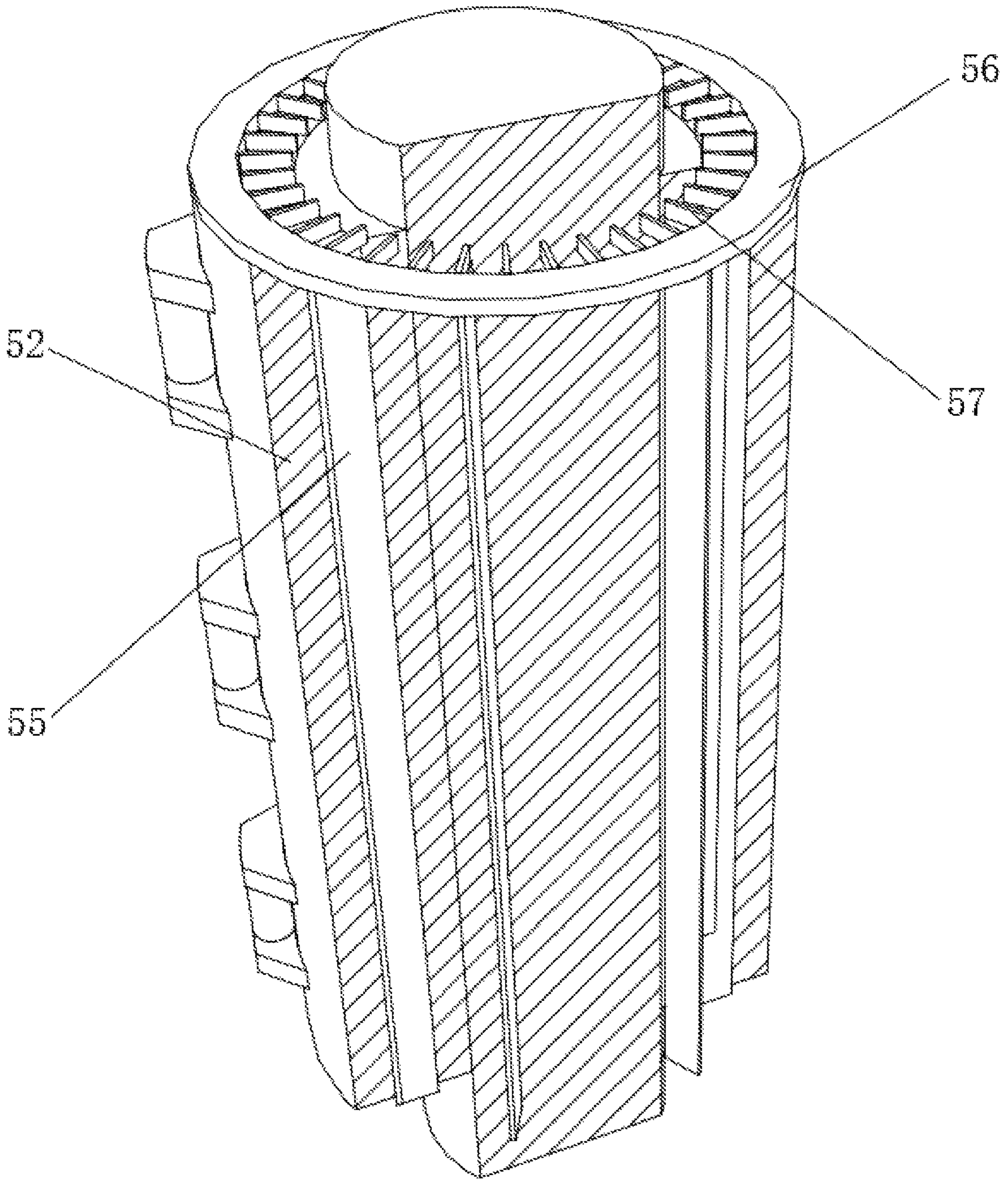
FIG. 5 is a schematic diagram of a sectional structure of a crushing device in accordance with the present disclosure.
Figure 6:
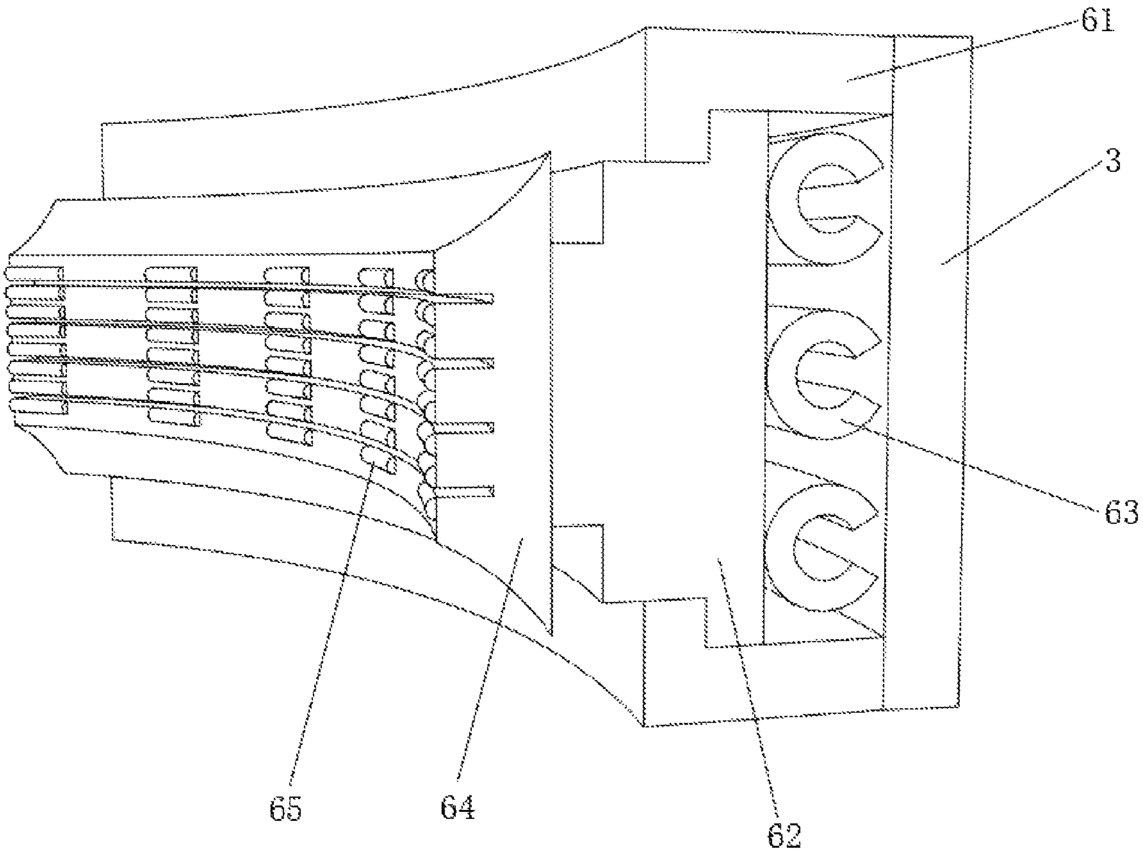
FIG. 6 is a structural schematic diagram of a grinding device in accordance with the present disclosure.
Figure 7:
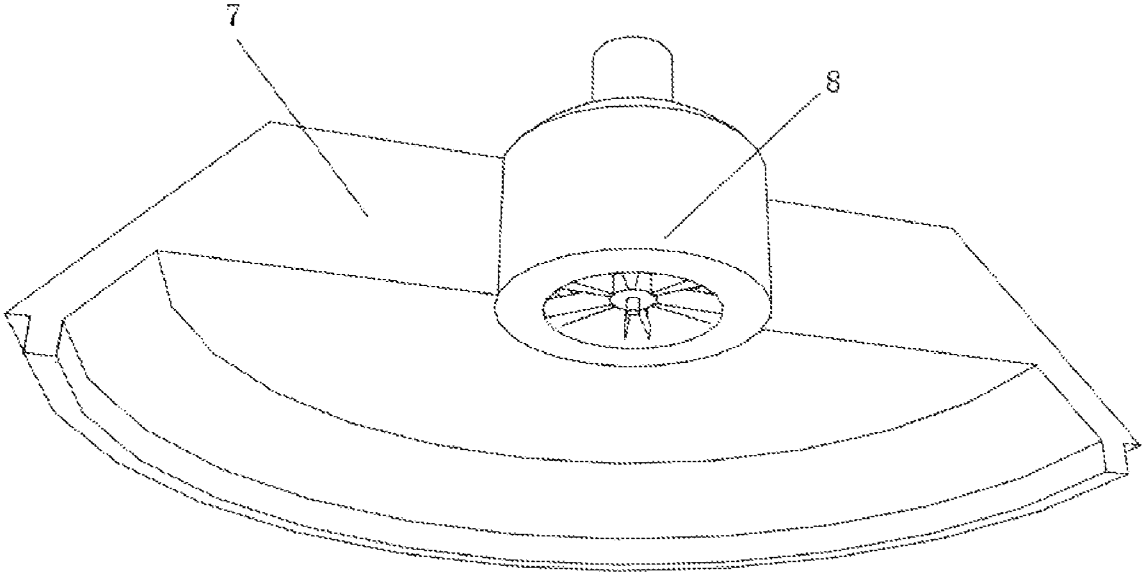
FIG. 7 is a structural schematic diagram of a cover plate in accordance with the present disclosure.
Figure 8:
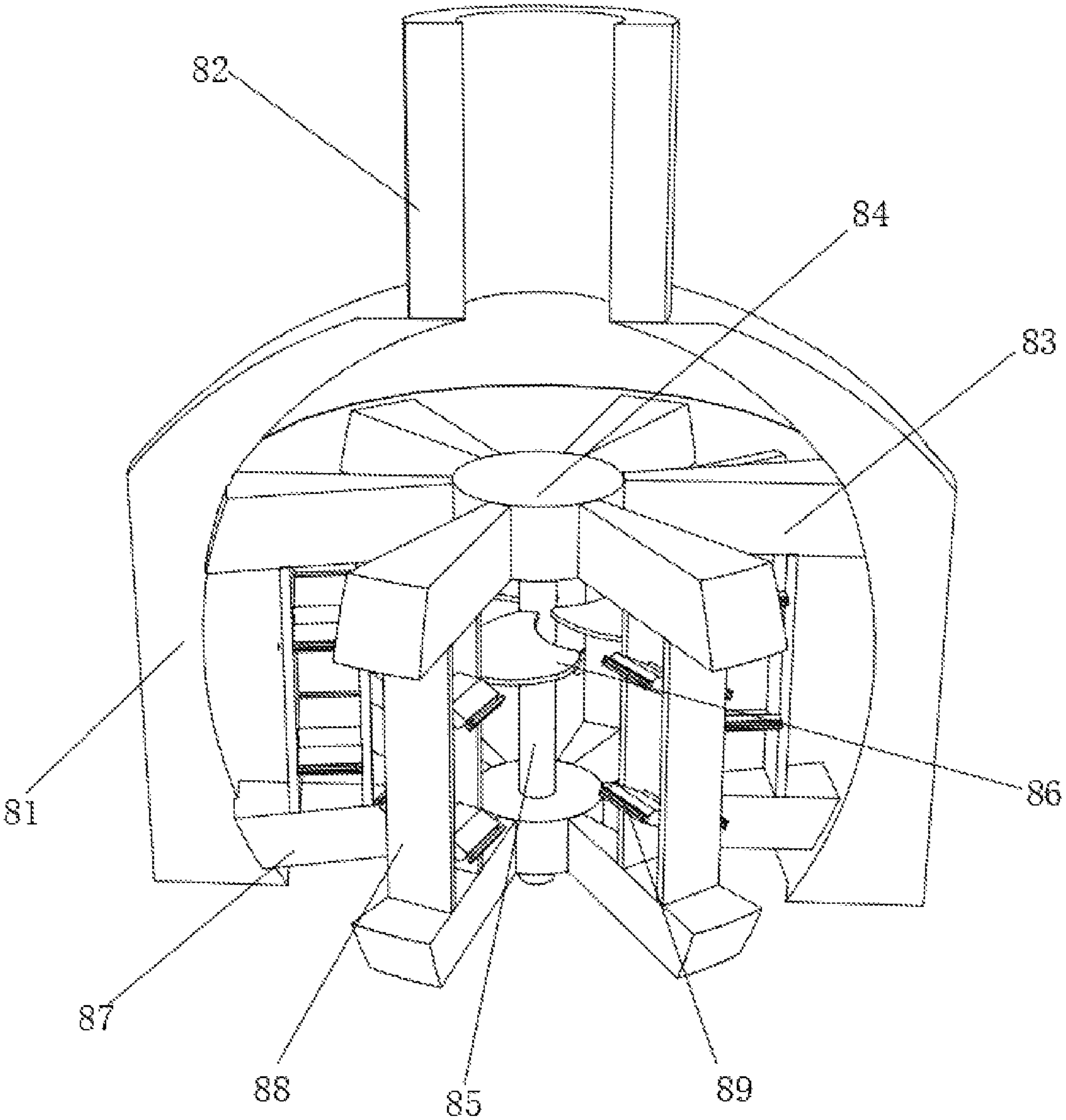
FIG. 8 is a structural schematic diagram of a suction device in accordance with the present disclosure.
Figure 9:
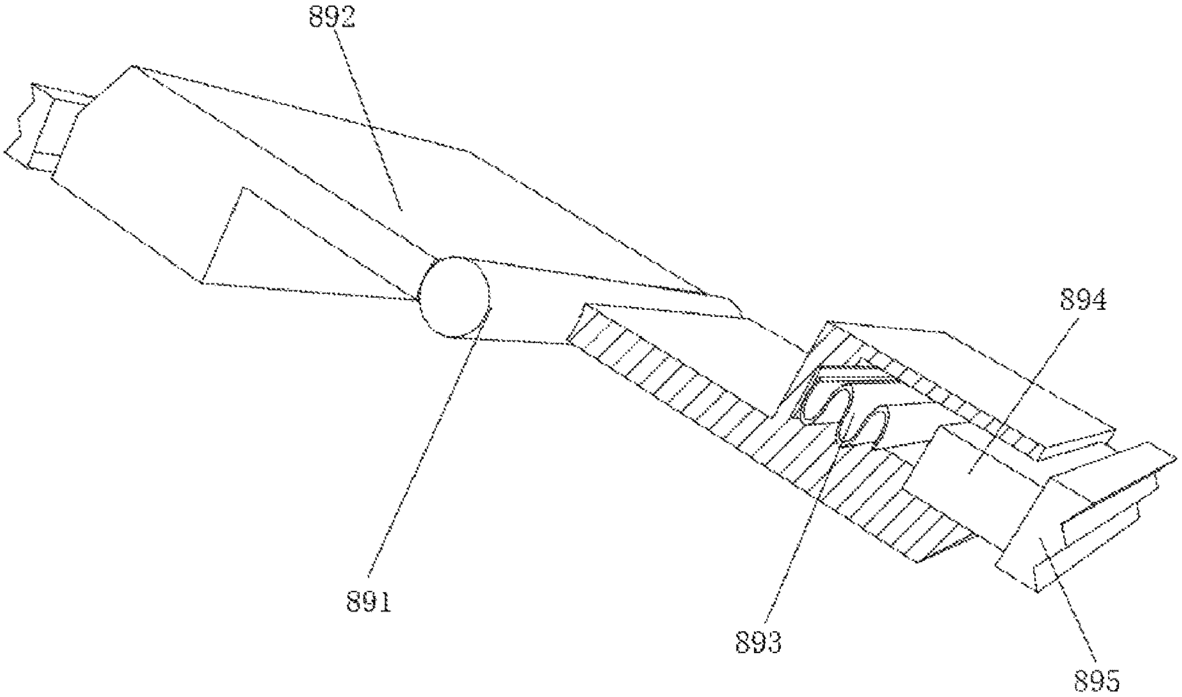
FIG. 9 is a structural schematic diagram of a fine grinding device in accordance with the present disclosure.

As shown in FIG. 1 through FIG. 9, a technical solution is provided by the present disclosure. A nano pulverizing device for processing reconstituted rice flour includes a bottom plate 1, support legs 2 are fixedly connected to corners of a lower surface of the bottom plate 1, a housing 3 is arranged on an upper surface of the bottom plate 1, and a rotating motor 4 is arranged on the lower surface of the bottom plate 1. The rotating motor 4 is provided to drive a grinding device 6 to produce a rotating effect, such that the grinding device 6 can generate a rotating friction effect with materials, thus achieving the effect of pulverizing the materials. The rotating motor 4 penetrates through the lower surface of the bottom plate 1 and extends to the upper surface of the bottom plate 1, a crushing device 5 is rotationally connected to one end, extending to the upper surface of the bottom plate 1, of the rotating motor 4.

A support frame 9 is fixedly connected to an inner wall of the housing 3, a support plate 10 is fixedly connected to a lower surface of the support frame 9, and a flexible plate 12 is fixedly connected to a lower surface of the support plate 10. An arc-shaped flexible plate 11 is fixedly connected between opposite surfaces of the support frame 9 and the support plate 10. The flexible plate 12 and the arc-shaped flexible plate 11 are provided to enable material scraps on an inner wall of the housing 3 to make contact with the crushing device 5 again through vibration, thus achieving the effect of sufficiently crushing the materials. The rotating motor 4 may generate vibration after starting to rotate. As the vibration of the housing 3 drives the flexible plate 12 and the arc-shaped flexible plate 11 on the lower surfaces of the support frame 9 and the support plate 10 to vibrate, the flexible plate 12 and the arc-shaped flexible plate 11 may amplify the produced vibration, thus vibrating the materials on the inner wall of the housing 3 down. The grinding device 6 is arranged at the inner wall of the housing 3, a clamping groove is provided on an upper surface of the housing 3, and the clamping groove provided on the upper surface of the housing 3 is sleeved with a cover plate 7.

The crushing device 5 includes a rotating column 51, and the rotating column 51 is connected to an output end of the rotating motor 4. The crushing device 5 is provided to crush the materials. During operation, an operator places the materials to be pulverized at an inner cavity of the housing 3, and then connects the rotating motor 4 to a power supply and turns on a switch of the rotating motor 4. The rotating motor 4 starts to operate and makes the rotating column 51 start to rotate. During the rotation of the rotating column 51, an outer surface of a grinding barrel 52 and a grinding column 54 both make contact with the materials, thus pulverizing the materials during high-speed rotation. An outer surface of the rotating column 51 is sleeved with the grinding barrel 52, support columns 53 are fixedly connected to an outer surface of the grinding barrel 52, and a grinding column 54 is rotationally connected between opposite surfaces of the support columns 53. A collecting groove is provided on an upper surface of the grinding barrel 52, and a clamping plate 55 is fixedly connected to the collecting groove provided on the upper surface of the grinding barrel 52. A fixing ring 56 is arranged on the upper surface of the grinding barrel 52, and a partition plate 57 is fixedly connected to a surface of the fixing ring 56. The collecting groove, the fixing ring 56 and the partition plate 57 are provided to collect materials which are pulverized to a certain diameter. After the materials are pulverized when passing through the grinding barrel 52 and the grinding column 53, during the rotation of the rotating column 51, materials with a small diameter are enabled to enter the collecting groove provided on the grinding barrel 52, and the partition plate 57 plays a role in screening.

The grinding device 6 includes a grinding device housing 61, and the grinding device housing 61 is fixedly connected to an inner wall of the housing 3. An inner cavity of the grinding device housing 61 is sleeved with a movable column 62, the movable column 62 penetrates through the grinding device housing 61 and extends to an outer surface of the grinding device housing 61. An extrusion plate 64 is fixedly connected to one end, extending to the outer surface of the grinding device housing 61, of the movable column 62. A grinding strip 65 is fixedly connected to an outer surface of the extrusion plate 64, an elastic column 63 is arranged at one end, away from the extrusion plate 64, of the movable column 62, and the elastic column 63 is in extrusion fit with the movable column 62. The grinding device 6 is provided to cooperate with the crushing device 5, thus achieving the effect of pulverizing the materials. During operation, the rotating motor 6 rotates to drive the crushing device 5 to rotate. During rotation, the materials may be pulverized between the crushing device 5 and the grinding device 6. The grinding strip 65 in the grinding device 6 can play a role in grinding. The movable column 62 and the elastic column 63 may provide a certain buffering effect by extruding with each other, thus preventing bulky materials from damaging the device.

An upper surface of the cover plate 7 is provided with a circular hole, and a suction device 8 is sleeved at the circular hole provided on the upper surface of the cover plate 7. The suction device 8 includes a suction device housing 81. A collecting pipe 82 is fixedly connected to an upper surface of the suction device housing 81, and a motor support plate 83 is fixedly connected to an inner wall of the suction device housing 81. A fan motor 84 is arranged at one end, away from the suction device housing 81, of the motor support plate 83, and a fan rotating column 85 is rotationally connected to a lower surface of the fan motor 84. Fan blades 86 are fixedly connected to an outer surface of the fan rotating column 85, and a bottom end of the fan rotating column 85 is sleeved with a bottom limit column 87. Suction device support plates 88 are fixedly connected between opposite surfaces of the bottom limit column 87 and the motor support plate 83, and a fine grinding device 89 is rotationally connected between opposite surfaces of the suction device support plates 88. The suction device 8 is provided to collect the materials which have been completely ground, and the pulverized materials can be collected by light suction.

During operation, a switch of the fan motor 84 is turned on by the operator, the fan motor 84 drives the fan rotating column 85 to rotate, thus enabling the fan blades 86 to generate suction during rotation to collect the materials. The fine grinding device 89 includes a fine grinding device rotating column 891 which is rotationally connected between opposite surfaces of the suction device support plates 88. A fine grinding fan plate 892 is fixedly connected to an outer surface of the fine grinding device rotating column 891. An inner cavity of the fine grinding fan plate 892 is sleeved with a fine grinding device movable column 894. A wavy line elastic sheet 893 is provided between opposite surfaces of the inner cavity of the fine grinding fan plate 892 and the fine grinding device movable column 894. The movable column 894 is in extrusion fit with the wavy line elastic sheet 893. The movable column 894 penetrates through the inner cavity of the fine grinding fan plate 892 and extends to an outer surface of the fine grinding fan plate 892, and a fine grinding plate 895 is fixedly connected to one end, extending to the outer surface of the fine grinding fan plate 892, of the movable column 894. The fine grinding device 89 is provided to further pulverize the materials. During the rotation of the fan, the fine grinding fan plate 892 also rotates, such that the materials passing through the fine grinding device 89 can become finer under the action of the fine grinding plate 895.

During use, the rotating motor 4 is provided to drive a grinding device 6 to produce a rotating effect, such that the grinding device 6 can generate a rotating friction effect with materials, thus achieving the effect of pulverizing the materials. The flexible plate 12 and the arc-shaped flexible plate 11 are provided to enable material scraps on an inner wall of the housing 3 to make contact with the crushing device 5 again through vibration, thus achieving the effect of sufficiently crushing the materials. The rotating motor 4 may generate vibration after starting to rotate. As the vibration of the housing 3 drives the flexible plate 12 and the arc-shaped flexible plate 11 on the lower surfaces of the support frame 9 and the support plate 10 to vibrate, the flexible plate 12 and the arc-shaped flexible plate 11 may amplify the produced vibration, thus vibrating the materials on the inner wall of the housing 3 down.

The crushing device 5 is provided to crush the materials. During operation, an operator places the materials to be pulverized at an inner cavity of the housing 3, and then connects the rotating motor 4 to a power supply and turns on a switch of the rotating motor 4. The rotating motor 4 starts to operate and makes the rotating column 51 start to rotate. During the rotation of the rotating column 51, an outer surface of a grinding barrel 52 and a grinding column 54 both make contact with the materials, thus pulverizing the materials during high-speed rotation.

The collecting groove, the fixing ring 56 and the partition plate 57 are provided to collect materials which are pulverized to a certain diameter. After the materials are pulverized when passing through the grinding barrel 52 and the grinding column 53, during the rotation of the rotating column 51, materials with a small diameter are enabled to enter the collecting groove provided on the grinding barrel 52, and the partition plate 57 plays a role in screening. The grinding device 6 is provided to cooperate with the crushing device 5, thus achieving the effect of pulverizing the materials. During operation, the rotating motor 6 rotates to drive the crushing device 5 to rotate. During rotation, the materials may be pulverized between the crushing device 5 and the grinding device 6. The grinding strip 65 in the grinding device 6 can play a role in grinding. The movable column 62 and the elastic column 63 may provide a certain buffering effect by extruding with each other, thus preventing bulky materials from damaging the device.

The suction device 8 is provided to collect the materials which have been completely ground, and the pulverized materials can be collected by light suction. During operation, a switch of the fan motor 84 is turned on by the operator, the fan motor 84 drives the fan rotating column 85 to rotate, thus enabling the fan blades 86 to generate suction during rotation to collect the materials. The fine grinding device 89 is provided to further pulverize the materials. During the rotation of the fan, the fine grinding fan plate 892 also rotates, such that the materials passing through the fine grinding device 89 can become finer under the action of the fine grinding plate 895.

Apparently, the described embodiments are a part rather than all embodiments. All other embodiments obtained by those of ordinary skill in the art based on the embodiments of the present disclosure without creative efforts shall fall within the protection scope of the present disclosure. The structures, devices and operation methods not specifically described and explained in the present disclosure, unless specifically described and limited, are implemented by conventional means in this field.

What is claimed is:

1. A nano pulverizing device for processing reconstituted rice flour, comprising a bottom plate, wherein support legs are fixedly connected to corners of a lower surface of the bottom plate, a housing is arranged on an upper surface of the bottom plate, and a rotating motor is arranged on the lower surface of the bottom plate; the rotating motor penetrates through the lower surface of the bottom plate and extends to the upper surface of the bottom plate, and a crushing device is rotationally connected to one end, extending to the upper surface of the bottom plate, of the rotating motor; and a support frame is fixedly connected to an inner wall of the housing, a support plate is fixedly connected to a lower surface of the support frame, a flexible plate is fixedly connected to a lower surface of the support plate, an arc-shaped flexible plate is fixedly connected between opposite surfaces of the support frame and the support plate; a grinding device is arranged at an inner wall of the housing, a clamping groove is provided on an upper surface of the housing, and the clamping groove provided on the upper surface of the housing is sleeved with a cover plate.

2. The nano pulverizing device for processing reconstituted rice flour according to claim 1, wherein the grinding device comprises a grinding device housing, the grinding device housing is fixedly connected to the inner wall of the housing, and a movable column is sleeved at an inner cavity of the grinding device housing, and the movable column penetrates through the grinding device housing and extends to an outer surface of the grinding device housing.

3. The nano pulverizing device for processing reconstituted rice flour according to claim 2, wherein an extrusion plate is fixedly connected to one end, extending to the outer surface of the grinding device housing, of the movable column, a grinding strip is fixedly connected to an outer surface of the extrusion plate, an elastic column is arranged on one end, far away from the extrusion plate, of the movable column, and the elastic column is in extrusion fit with the movable column.

4. The nano pulverizing device for processing reconstituted rice flour according to claim 1, wherein a circular hole is provided on an upper surface of the cover plate, a suction device is sleeved at the circular hole provided on the upper surface of the cover plate, the suction device comprises a suction device housing, a collecting pipe is fixedly connected to an upper surface of the suction device housing, a motor support plate is fixedly connected to an inner wall of the suction device housing, a fan motor is arranged at one end, away from the suction device housing, of the motor support plate, a fan rotating column is rotationally connected to a lower surface of the fan motor, and fan blades are fixedly connected to an outer surface of the fan rotating column.

5. The nano pulverizing device for processing reconstituted rice flour according to claim 4, wherein a bottom end of the fan rotating column is sleeved with a bottom limit column, suction device support plates are fixedly connected between opposite surfaces of the bottom limiting column and the motor support plate, and a fine grinding device is rotationally connected between opposite surfaces of the suction device support plates.

* * * * *